United States Patent

[11] 3,556,286

[72] Inventors Ryunosuke Naito, Takatsuki, Sakan Komatsu, Ibaragi, Saburo Yamane, Toyonaka, Yoshiro Higashiyama, Toyama, Japan
[21] Appl. No. 824,615
[22] Filed May 14, 1969
[45] Patented Jan. 19, 1971
[73] Assignee Kuraray Co., Ltd. Sakazu Kurashiki, Okayama Prefecture, Japan a corporation of Japan
[32] Priority May 18, 1968
[33] Japan
[31] No. 43/33667

[54] ENDLESS BELT CONVEYOR
6 Claims, 4 Drawing Figs.

[52] U.S. Cl. .................................................... 198/201
[51] Int. Cl. .................................................... B65g 15/40
[50] Field of Search .................................................... 198/191, 201

[56] References Cited
UNITED STATES PATENTS
| | | | |
|---|---|---|---|
| 632,750 | 9/1899 | Ridgway | 198/201 |
| 2,964,855 | 12/1960 | Fava | 198/201 |
| 2,998,121 | 8/1961 | Gilbert | 198/201 |

Primary Examiner—Richard E. Aegerter
Attorney—Stepno and Neilan

ABSTRACT: An endless belt conveyor having guide members secured to the underside of the belt, the guide members engaging stationary guide rails, the guide rails having a downwardly inclined portion at the inlet end of the conveyor, and guide plates engaging the longitudinal edges of the belt to fold the edges of the belt upwardly whereby the guide rails and the guide plates cooperate to change the planar belt to a U-shaped trough configuration adjacent the inlet end of the conveyor.

PATENTED JAN 19 1971 3,556,286

INVENTORS
Ryunosuke Naito
Sakan Komatsu
Saburo Yamane
Yoshiro Higashiyama

Stevens and Neilan Attorneys

ENDLESS BELT CONVEYOR

The present invention invention relates to an endless belt conveyor and more particularly to a conveyor in which the belt is formed into the configuration of a U-shaped trough over a portion of the upper load carrying pass of the belt, with the trough functioning to hold material deposited upon the belt. When the belt reaches the discharge end of the conveyor, the belt is flattened out and returned in a flattened condition to the loading end of the conveyor.

To accomplish these objectives, a plurality of guide members are secured along the underside of the conveyor belt in the center thereof. The guide members engage stationary guide rails with the guide rails being positioned to pull down the central part of the conveyor belt as the U-shaped trough is formed while guide plates simultaneously contact the edges of the conveyor belt and press said edges inwardly whereby the conveyor belt assumes a U-shaped configuration as seen in transverse cross section.

The guide members secured to the underside of the conveyor belt preferably comprise a plurality of U-shaped stays which are disposed transverse to the direction of travel of the belt, the stays having a lug at each end thereof, and guide rollers rotatably mounted in the lugs and engaging the stationary guide rails. The stays are preferably positioned against the underside of the conveyor belt and secured thereto by fastening means which extend through the stays and the conveyor belt into driven V-belts which are trained around terminal rollers at opposite ends of the conveyor belt.

DETAILED DESCRIPTION OF THE INVENTION

The structure and operation of the present invention will now be described more fully with reference to the attached drawings.

Figure 1:
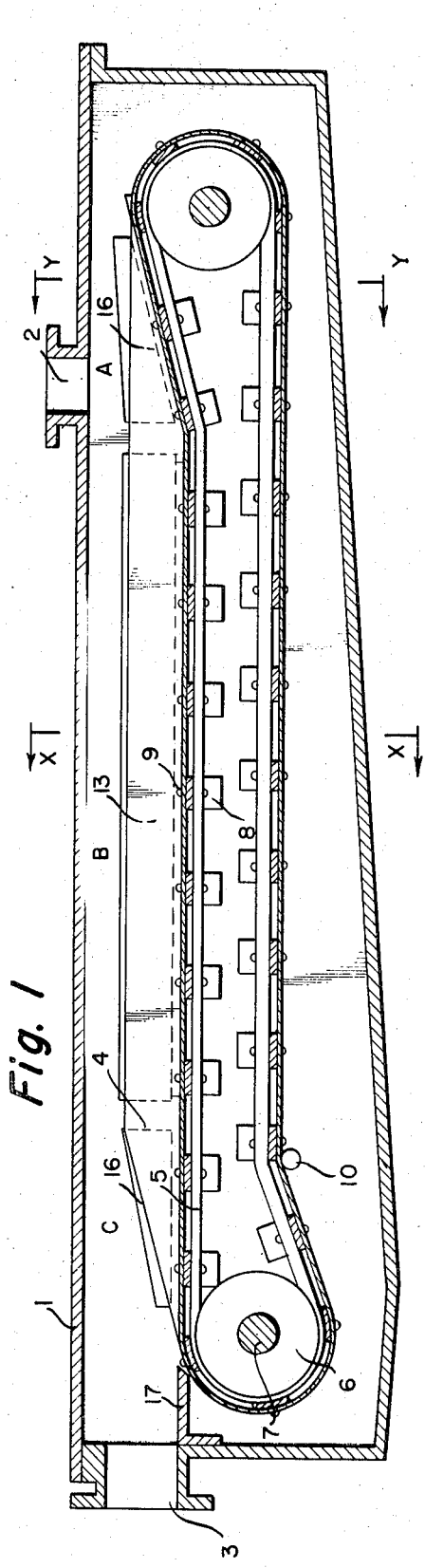
FIG. 1 is a longitudinal sectional view of a preferred embodiment of the present invention.
Figure 4:
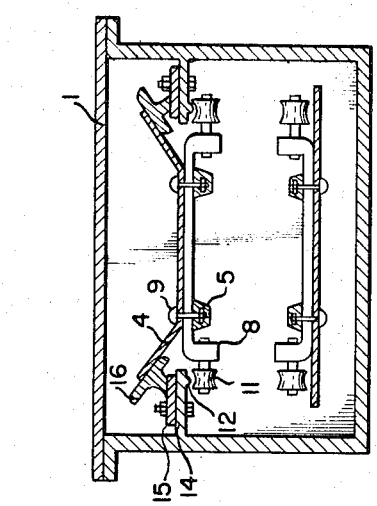
FIG. 4 is a vertical cross-sectional view of Y—Y.

Reference numeral 1 denotes an enclosed casing which has an inlet 2 and an outlet 3. A flexible conveyor belt 4 is trained around a pair of terminal rollers 6 which rotate on axes 7. As shown in FIG. 1, the roller 6 at the inlet end of the casing, which is designated by the letter A, is disposed slightly higher than the roller 6 at the discharge end which is designated by the letter C. A pair of V-belts 5 constitutes the driving connection between the rollers 6 and the conveyor belt 4.

Figure 3:
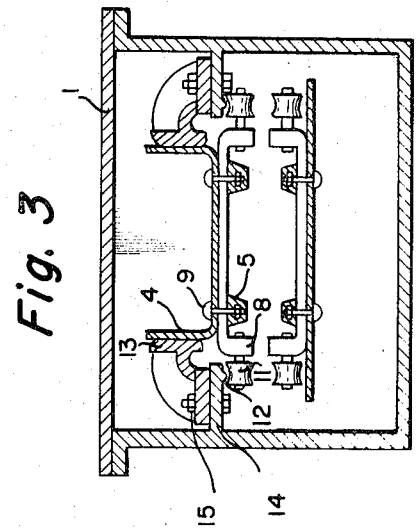
FIG. 3 is a vertical cross-sectional view taken on the line X—X of FIG. 1.
Figure 2:
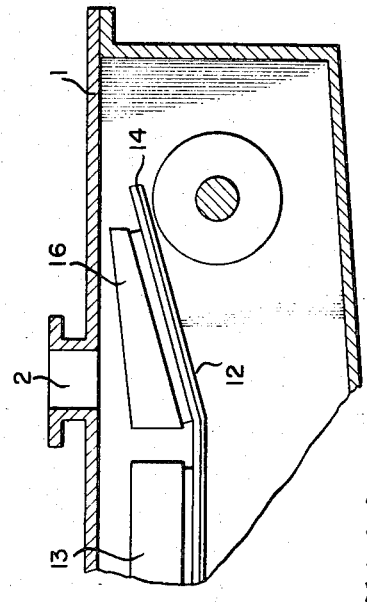
FIG. 2 is a partial longitudinal sectional view of the embodiment of FIG. 1 with the conveyor belt omitted to show details of the guide plates which engage the edges of the conveyor belt.

As is best seen in FIG. 3, a plurality of U-shaped stays 8 are secured to the underside of conveyor belt 4 between the conveyor belt and the driving belts 5 by suitable fastening means such as bolts 9 or by adhesives. The conveyor belt 4, driving belts 5, and stays 8 are thus integrally united and cooperate to move together around the rotating terminal rollers 6.

Stays 8 have lugs at opposite ends thereof which are depending when the stays are positioned along the upper pass of the conveyor belt. The lugs receive and rotatably support the shafts or guide rollers 11. The guide rollers 11 run along guide rails 12 which in the illustrated embodiment are positioned at the underside of stationary support members 14 which may be integral with the wall of casing 1. The guide rails 12 at the inlet end A of the conveyor are downwardly inclined, the guide rails then run in a generally horizontal plane to the discharge end of the conveyor belt.

The lower or return pass of the conveyor belt passes over a support and tensioning roller 10 as seen in FIG. 1.

Guide plates 16 at each end of the conveyor and a guide plate 13 disposed along the central portion B of the conveyor belt engage the longitudinal edges of the upper pass of the conveyor belt wall. The pair of guide plates 16 at the inlet end, end A, are inclined both downwardly and also inwardly towards each other.

When the guide rollers 11 engage the downwardly inclined sections of the guide rails 12 at end A, the central portion of the belt is pulled downwardly while the longitudinal edges of the belt engage the downwardly and inwardly inclined pair of guide plates 16 with the result that the edges of the conveyor belt 4 are folded upwardly relative to the central portion of the conveyor belt. Thus, with the central portion of the conveyor belt being forcibly pulled downwardly and the edges of the conveyor belt being bent upwardly, the conveyor belt assumes a trough shape which is U-shaped in transverse cross section. The portion of the conveyor belt which is now in the trough-shaped configuration then passes into the central portion B where the guide plates 13 maintain the edges of the conveyor belt in a generally vertical position. As the conveyor belt approaches the end C, the outwardly flaring guide plate 16 at that end cause the edges of the conveyor belt which were generally vertical as mentioned above to flatten out whereby the conveyor belt 4 is completely flat as it reaches and turns under the terminal roller 6, and returns as the unloaded lower pass over guide roller 10 to the terminal roller 6 at the inlet end of the casing. It will of course be appreciated that this sequence of operations is continuous for any given point on the conveyor belt.

Although the present invention has been described for the purpose of illustration with respect to the presently preferred embodiment thereof, the invention is not limited to specific details thereof. For example, instead of employing the stays and the guide rollers attached thereto, an elastic steel belt may be employed beneath the central portion of the conveyor belt 4, with guide rollers provided at both edges thereof. Also, the conveyor may be designed with toothed drive rollers provided between the terminal rollers 6 in lieu of the V-belts 5, and with an elastic steel belt provided below the central portion of the conveyor belt having a toothed guide groove engageable with and driven by said toothed drive rollers.

The conveyor belt 4 suitably may be comprised of or may have a coating of polyethylene or a fluorine containing resin, or other material to which the substances to be conveyed do not adhere.

Since the conveyor belt of the present invention is in a trough shape during operation and the central portion of the belt is below the level of both edges, a large amount of material may be transported, and especially liquid material may be held on the belt without loss.

A conveyor of the present invention may be used not only as a simple conveying apparatus but also as a chemical reactor. For example, it may be used in the continuous saponification of polyvinyl ester since the trough shape enables a large amount of polyvinyl ester to be held on the belt. Homogenous and transparent polyvinyl alcohol with high packing density and without any heterogenity can be produced using this apparatus without producing any fibrous and film products.

When the apparatus of the invention is used as a chemical reactor, in order to avoid the evolution of volatile material and to keep reaction conditions such as temperature and others constant, the casing is preferably made airtight, and a heat exchange jacket is installed on the outside of the casing. Also a vent or an exit for reacting waste may be provided.

Chute 17 which is between the discharge end of the conveyor and the opening to the outlet 3 is provided at the inside wall of casing 1.

We claim:

1. A belt conveyor comprising an endless conveyor belt disposed around a pair of terminal rollers, the terminal roller disposed at the inlet end of the conveyor belt being disposed above the terminal roller at the discharge end of the conveyor belt, a plurality of guide members disposed beneath and secured to said conveyor belt inwardly from the longitudinal edges thereof, guide rails means engaging said guide members along the upper pass of said conveyor belt, said guide rail means including a downwardly inclined section adjacent the terminal roller at the inlet end of said conveyor belt and a generally horizontal section extending to the discharge end of said conveyor belt, and a pair of guide plates being inclined downwardly and towards each other disposed in the region of the downwardly inclined guide rails and engaging the longitudinal edges of said conveyor belt to fold said longitudinal edges upwardly with respect to the transverse central portion of said conveyor belt to deform said conveyor belt into a substantially U-shaped trough configuration.

2. A conveyor according to claim 1, further comprising driving belt means secured to the underside of said conveyor belt.

3. A conveyor according to claim 2, wherein said driving belt means comprise a pair of endless V-belts.

4. A conveyor according to claim 2, wherein said guide members include a plurality of transversely disposed stays, and rotatable guide rollers secured at the ends of said stays and positioned to engage said guide rails means.

5. A conveyor according to claim 1, further comprising guide means disposed at the discharge end of said conveyor belt and engaging the longitudinal edges of said conveyor belt to flatten said conveyor belt from the U-shaped trough configuration to a substantially planar configuration at the terminal roller at the discharge end of said conveyor belt.

6. A conveyor according to claim 1, further comprising a plurality of transverse stays secured to the underside of the transverse central portion of said conveyor belt, and a pair of endless V-belts disposed beneath and secured to said stays, a plurality of guide rollers secured to lugs provided at the ends of said stays and positioned to engage said guide rail means, and guide means disposed at the discharge end of said conveyor belt and engaging the longitudinal edges of said conveyor belt to flatten said conveyor belt from the U-shaped trough configuration to a substantially planar configuration at the terminal roller at the discharge end of said conveyor belt.